No. 724,703. PATENTED APR. 7, 1903.
J. W. HUMPHREYS.
DREDGING MACHINE.
APPLICATION FILED JUNE 19, 1902.
NO MODEL. 3 SHEETS—SHEET 1.
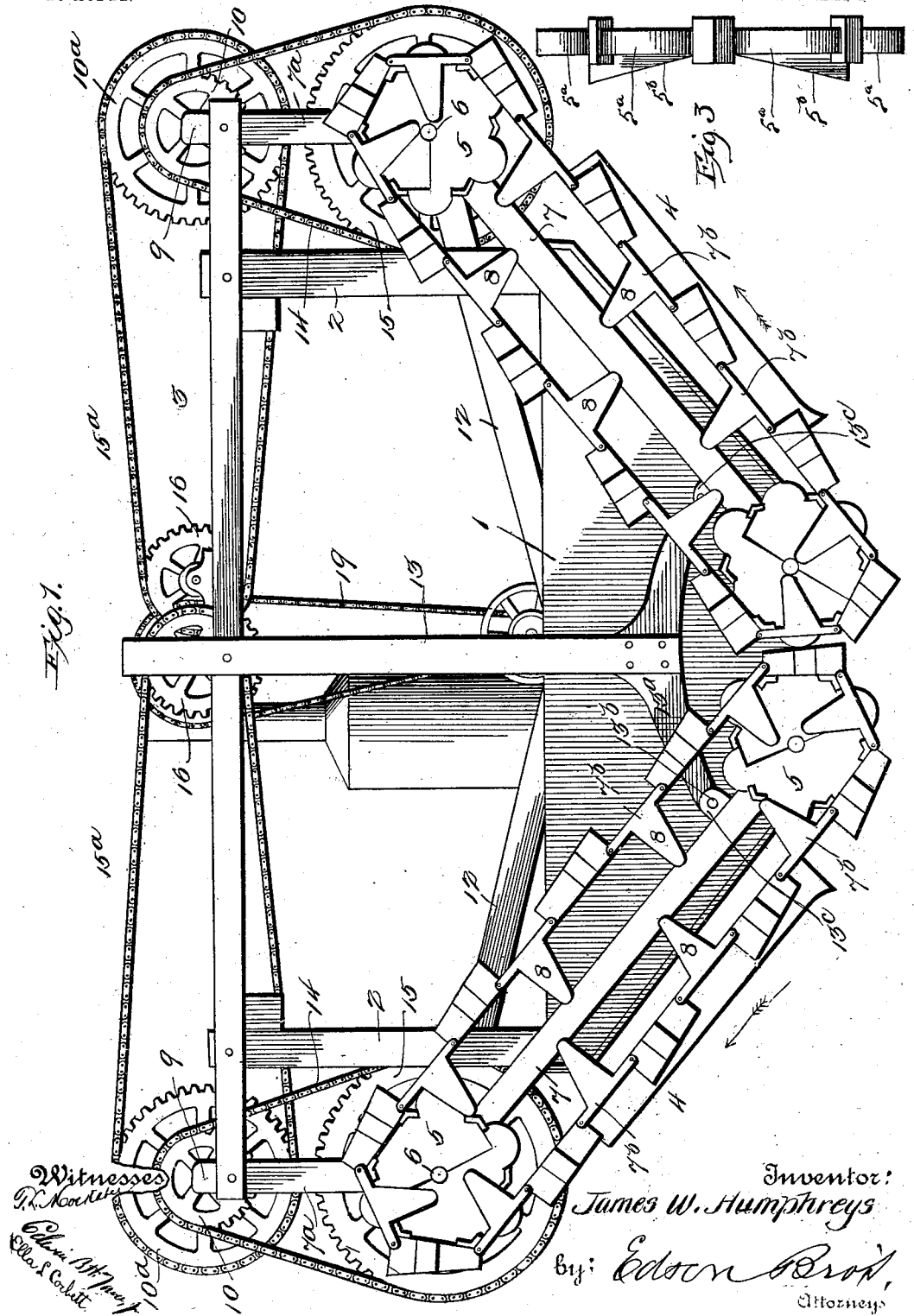

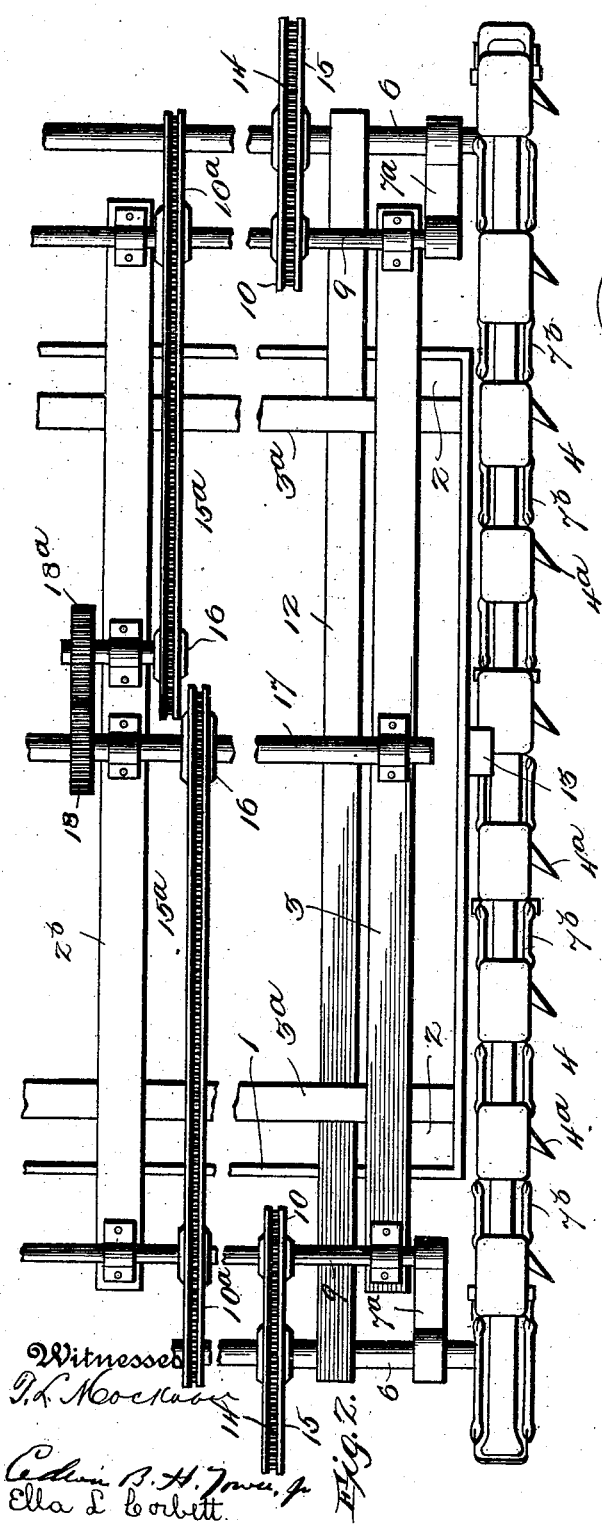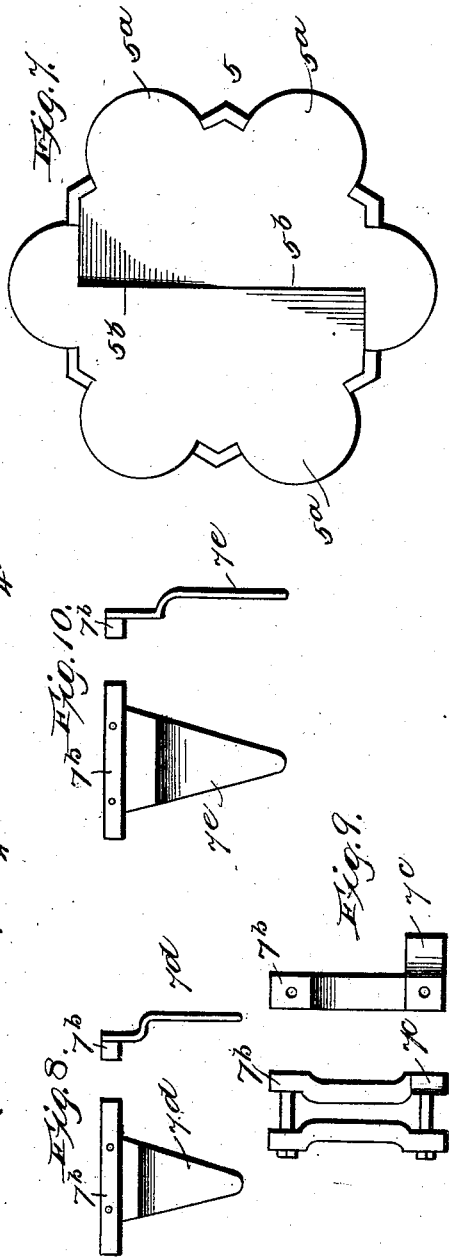

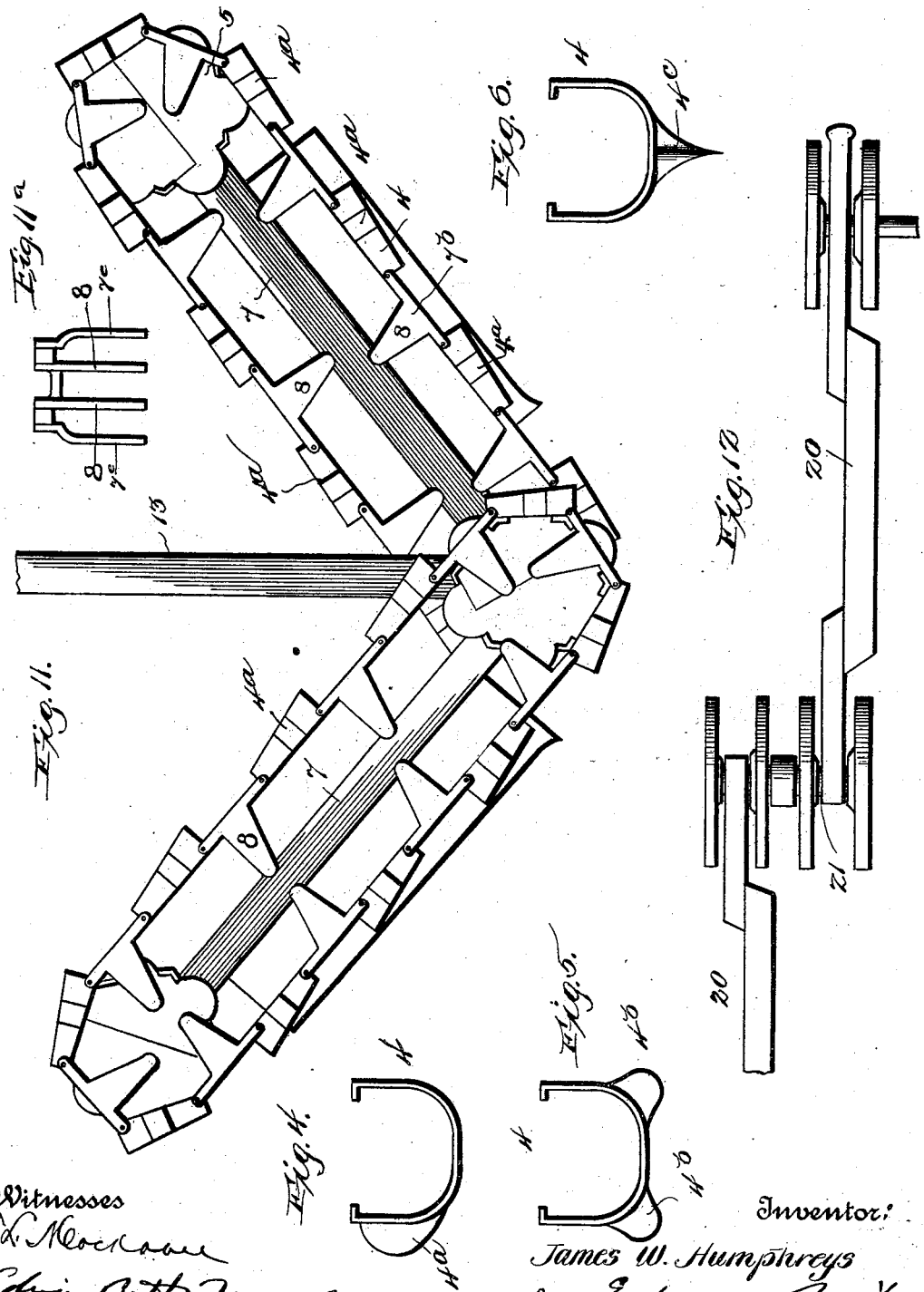

UNITED STATES PATENT OFFICE.

JAMES W. HUMPHREYS, OF IROQUOIS, ILLINOIS.

DREDGING-MACHINE.

SPECIFICATION forming part of Letters Patent No. 724,703, dated April 7, 1903.

Application filed June 19, 1902. Serial No. 112,351. (No model.)

*To all whom it may concern:*

Be it known that I, JAMES W. HUMPHREYS, a citizen of the United States, residing at Iroquois, in the county of Iroquois and State of Illinois, have invented certain new and useful Improvements in Dredging-Machines, &c.; and I do hereby declare the following to be a full, clear, and exact description of the invention, such as will enable others skilled in the art to which it appertains to make and use the same.

My invention relates to certain improvements in ditching or dredging machines.

It has for its object to increase the efficiency or working capacity of the machine, to provide for the ready adjustment of the excavating mechanism, to effect the expeditious removal or delivery of the loosened earth, and to otherwise promote facility and expedition of operation and construction of the parts.

It consists of the combination and arrangement of parts substantially as hereinafter more fully disclosed, and specifically pointed out by the claims.

In the accompanying drawings, illustrating the preferred embodiment of my invention, Figure 1 is a front elevation. Fig. 2 is a plan view. Fig. 3 is a side or edge view of one of the cutters 5. Fig. 4 is a side view of one of the scoops for dredging purposes. Fig. 5 is a like view of a form of scoop used for tile-ditching. Fig. 6 is also a like view of another form of scoop used for the same purpose in connection with the form of scoop shown in Fig. 5. Fig. 7 is a front view of one of the cutters 5. Fig. 8 is a front view and a plan or edge view of one of the link connections between the scoops, disclosing more particularly the cutter thereof. Fig. 9 is a plan or edge view and a front view of a like link connection with a cutter of the minimum cutting capacity. Fig. 10 is a front view and a plan or edge view of a like link connection having a cutter of greater or maximum cutting capacity. Fig. 11 is a front elevation of a modified form of the endless belt of scoops, &c. Fig. 11$^a$ is a detailed view of one of the endless-belt links. Fig. 12 is a plan view showing more especially the swinging frames as embraced in Fig. 11, omitting the endless belts of scoops, &c.

It will be understood that I do not limit myself to details, as they may be changed without departing from the spirit of my invention and the same remain intact and be protected.

In carrying out my invention I erect, as shown, preferably upon a float 1, a suitable framing comprising uprights 2, arranged, preferably, at the corners of said boat, and cross and longitudinal timbers or beams 3 3$^a$, respectively, suitably bolted together. At the front end of said boat are arranged, as also, preferably, at the rear end thereof, two series of scoops 4, the scoops of each series being articulated or pivoted together in connection with interposed links 7$^b$ in endless belt form, the belts thus formed each compassing pulleys 5, formed with cutters 5$^b$ 5$^b$, presently more fully referred to. Said scoops are preferably substantially U-shaped and have lateral cutting edges, as at 4$^a$, presented toward and further aiding the cutting of the embankment or surface being removed or reduced. Said scoops when used for tile-ditching are provided one with bottom corner cutting edges at the forward end, as at 4$^b$, and a succeeding one with a bottom central cutting edge at said end, as at 4$^c$. The cutting action of one scoop thus supplements the cutting action of the other, while the two forms of scoops alternate one another throughout the endless belts of said scoops, thus increasing the cutting capacity of said scoops. The upper pulleys or sprockets are carried or secured upon shafts 6, journaled or hung in swinging frames 7 7$^a$, one arranged at each end of the boat, the lower pulleys or sprockets having their axes or shafts bearing or journaled also in said swinging frames at or near their lower ends and in close proximity to each other. Said series of endless belts of scoops have their connecting-links 7$^b$ provided with guides 8, flanking or standing opposite the swinging frames to prevent lateral displacement of said scoops, and consequently their contact with the embankment or earth in front. When used for dredging purposes, said links are also equipped with cutters 7$^c$ 7$^d$ 7$^e$, offset laterally therefrom toward the embankment or surface to be cut away for aiding that purpose. Said cutters vary in length, a cutter 7$^c$ on one link having the minimum cutting action or capacity for effecting the initial cut. A cutter 7$^d$ on a succeeding link has an increased cutting action, and a cutter 7ᶜ on a third adjoining link has a still greater cutting action, said two latter cutters following up the action of the initial cutter and one another, as will be readily appreciated, thus greatly promoting the efficiency of the machine. Said sprockets or pulleys are constructed preferably as shown, being approximately hexagonal in general outline and having rounded projections or teeth 5ᵃ upon their peripheries to afford effective engagement with the endless belts of scoops which they actuate in the excavating operation. Said pulleys have laterally-outstanding and oppositely-cutting edges or lips 5ᵇ to remove or cut off the earth or embankment as the machine advances and adapted to permit the thus detached or removed earth to enter said series of scoops as they pass around said pulleys, said scoops themselves cutting or removing the earth intermediately of said lips, all of the thus detached or removed earth being elevated and finally delivered laterally beyond the excavation or ditch thus being formed. Said swinging frames have their upper vertical bars 7ᵃ pivotally suspended preferably from shafts 9, suitably supported or bearing upon the upper bars of the framing 2 3 and carrying gearing or pinions 10 10ᵃ, the purpose of which will presently appear. Said swinging frames also have their upper vertical bars 7ᵃ, together with their diagonal or lower bars 7, pivotally connected to the shafts or rods 6, carrying the cutters 5, and to which are connected bars or braces 12, suitably secured preferably in the hold of the boat for steadying or bracing in position said swinging frames. As a preferable means for effecting the convenient raising or vertical adjustment of said swinging frames with the endless belts of scoops and pulleys when required a standard or bar 13 may be used adapted to be suitably held in a fixed position and centrally secured or connected to a yoke or bail 13ᵃ, pivotally connected to the diagonal bars 7 of said swinging frames near the lower ends of said bars. The connection between said yoke and said swinging-frame bars is preferably effected by lateral studs 13ᵇ, formed upon said yoke and entering or engaging perforated lugs or ears 13ᶜ, projecting from said bars. The endless belts of scoops, together with the pulleys, are actuated in performing the excavating operation preferably by chain belts 14 compassing toothed wheels or pinions 15, carried by the shafts 6, and pinions 10 on the shafts 9, said shafts 9 being similarly belted up, as at 15ᵃ, with toothed wheels or pinions 16 16. One of said pinions 16 is secured upon a driving or line shaft 17, intergeared, as at 18 18ᵃ, with the shaft of the other one of said pinions 16, said shaft 17 being driven from the engine or motor by additional belting 19 and toothed wheels or pulleys, as will be readily appreciated.

The shaft 17, together with the gearing 16 18 18ᵃ, is supported upon a cross beam or bar 2ᵇ of the framing 2 3, said shaft being additionally supported at the front and rear ends of said framing. It will be observed that when it is desired to raise said swinging frames with the endless belts of scoops and pulleys the braces 12 are first freed or disconnected at their inner ends in the hold of the boat and the bar or standard 13 then accordingly adjusted or manipulated. It will be further observed that although the cutting edges of the front arrangement of said scoops would leave a central wedge-like formation in the bottom of the ditch or excavation the action of the cutting edges of the rear arrangement of said scoops alternating with the action of the cutting edges of the front arrangement of said scoops, as is practically to be the case, will remove said wedge. Also said endless belts of scoops, with the pulleys, are so arranged upon their carrying means as to be capable of being adjusted or moved nearer together or farther apart, as circumstances may demand.

In the modification as disclosed by Figs. 11 and 12, respectively, it will be noted that the swinging frames 20 20 are staggered in their arrangement with their lower ends and the bottom pulleys with cutting edges carried by a common shaft 21, thus providing for cutting or forming the ditch or excavation without a ridge unaided by a second or rear series of belts of scoops and cutters. The staggered arrangement or construction of the swinging frames takes the cutters and scoops of the two series out of the way of one another.

Having thus described my invention, what I claim as new, and desire to secure by Letters Patent, is—

1. A machine of the character described, having an endless belt of scoops and pulleys furnished with outstanding oppositely-cutting edges or lips, and encompassed by said belt of scoops, substantially as set forth.

2. A machine of the character described, having a swinging frame carrying pulleys equipped with outstanding cutting edges or lips, and endless belts of scoops encompassing said pulleys, substantially as set forth.

3. A machine of the character described, having a swinging frame carrying an endless belt of scoops, means arranged on said swinging frame for actuating said belt of scoops, means for removing the earth and delivering it into said scoops, and means for vertically adjusting said swinging frames comprising a standard or bar yoked up with said frames, substantially as set forth.

4. A machine of the character described, having an endless belt of scoops interconnected by links having guides, and means for carrying said belt of scoops, substantially as set forth.

5. A machine of the character described, having a belt of scoops, means for actuating said belt of scoops, and a swinging frame comprising suspended vertical bars and diagonal bars, said vertical and diagonal bars being pivotally connected together, and means for adjusting said frame, with said belt of scoops, substantially as set forth.

6. A machine of the character described, having a swinging frame, carrying pulleys equipped with cutters and endless belts of scoops, and braces or stays connected up with said swinging frame and suitably held in position, substantially as set forth.

7. A machine of the character described, having a swinging frame, carrying pulleys equipped with cutters and endless belts of scoops, braces or stays connected up with said swinging frame and suitably held in position, and a regulating or adjusting bar yoked to said frame, substantially as set forth.

8. A machine of the character described, having an endless belt of scoops provided with bottom corner cutting edges at the forward end, substantially as set forth.

9. A machine of the character described, having an endless belt of scoops with the connecting-links therebetween equipped with lateral offset cutters, substantially as set forth.

10. A machine of the character described, having an endless belt of scoops with the connecting-links therebetween equipped with offset lateral cutters of varying cutting capacity, substantially as set forth.

In testimony whereof I affix my signature in presence of two witnesses.

JAMES W. HUMPHREYS.

Witnesses:
A. C. TOWNE,
LIDA WAGNER.